US009514120B1

(12) United States Patent
Chen et al.

(10) Patent No.: US 9,514,120 B1
(45) Date of Patent: Dec. 6, 2016

(54) CLASSIFICATION OF A STRING AS A TYPOGRAPHICAL ERROR BASED ON FEEDBACK

(75) Inventors: Hong Chen, Bellevue, WA (US); Michael Patrick Bacus, Seattle, WA (US); Ming Zhao, Bellevue, WA (US)

(73) Assignee: Amazon Technologies, Inc., Reno, NV (US)

( * ) Notice: Subject to any disclaimer, the term of this patent is extended or adjusted under 35 U.S.C. 154(b) by 726 days.

(21) Appl. No.: 13/532,183

(22) Filed: Jun. 25, 2012

(51) Int. Cl.
*G06F 17/00* (2006.01)
*G06F 17/27* (2006.01)

(52) U.S. Cl.
CPC .......... *G06F 17/273* (2013.01); *G06F 17/274* (2013.01); *G06F 17/2735* (2013.01)

(58) Field of Classification Search
CPC . G06F 17/273; G06F 17/2735; G06F 17/274
USPC ................................................. 715/257, 259
See application file for complete search history.

(56) References Cited

U.S. PATENT DOCUMENTS

| 7,296,019 | B1* | 11/2007 | Chandrasekar et al. | |
|---|---|---|---|---|
| 8,290,206 | B1* | 10/2012 | Meyers | G06Q 10/101 382/100 |
| 8,553,930 | B1* | 10/2013 | Myers | G06Q 10/101 382/100 |
| 8,650,476 | B1* | 2/2014 | Belle | G06F 17/241 705/26.35 |
| 9,342,233 | B1* | 5/2016 | Dimson | G06F 3/0488 |
| 9,384,389 | B1* | 7/2016 | Sankaranarayanan | G06K 9/00456 |
| 2002/0010726 | A1* | 1/2002 | Rogson | 707/533 |
| 2003/0084041 | A1* | 5/2003 | Dettinger | 707/5 |
| 2005/0125217 | A1* | 6/2005 | Mazor | 704/1 |
| 2007/0271089 | A1* | 11/2007 | Bates et al. | 704/9 |
| 2008/0155398 | A1* | 6/2008 | Bodin et al. | 715/257 |
| 2008/0178076 | A1* | 7/2008 | Kritt | G06F 17/273 715/257 |

* cited by examiner

*Primary Examiner* — Scott Baderman
*Assistant Examiner* — Matthew G McVicker
(74) *Attorney, Agent, or Firm* — Lowenstein Sandler LLP

(57) ABSTRACT

A computing device hosting a server identifies one or more potential typographical errors in a work using an initial reference. The computing device sends data indicative of the presence of the potential typographical errors to users. The computing device collects feedback for the work from the users. The feedback for the work indicates whether the potential typographical errors are author-intended strings. The computing device combines the user feedback for the work with user feedback for other works and sorts the combined user feedback based on one or more selected parameters. The computing device determines, based on the sorted user feedback, that one or more of the potential typographical errors includes an acceptable string and updates the initial reference to include the acceptable string.

20 Claims, 6 Drawing Sheets

CLASSIFICATION OF A STRING AS A TYPOGRAPHICAL ERROR BASED ON FEEDBACK

BACKGROUND OF THE INVENTION

Publishing can include distribution of printed works, such as books, newspapers, magazines, journals, etc. and the electronic distribution of a work to electronic resources, such as electronic books (e-books), websites, blogs, etc. Typically, in the publishing industry, a publisher corrects typographical errors (typos) made in the author's work. Conventional solutions, such as typo detection tools, can help authors find the typos in their works before they submit their works to a publisher. However, such conventional solutions have limited capabilities in defining the standard for identifying typos. Typically, traditional solutions use a general dictionary to define the scope of errors.

Certain types of spellings could be typos in some situations and may not be typos in other situations. For example, in the computer industry the term "Bluetooth" is usually constructed as one word. According to a general dictionary, "Bluetooth" may be identified as a typo and may be recommended to be separated into two words and/or to not capitalize the letter "B." Conventional typo detection solutions may result in an inefficient use of resources by incorrectly identifying typos in works which may result in publishers attempting to make corrections in a work that are not warranted.

BRIEF DESCRIPTION OF THE DRAWINGS

The embodiments described herein will be understood more fully from the detailed description given below and from the accompanying drawings, which, however, should not be taken to limit the application to the specific embodiments, but are for explanation and understanding only.

DETAILED DESCRIPTION OF THE PRESENT INVENTION

Methods and systems for progressively improving typographical error detection based on author intent are described. In one embodiment, a computing device hosting a server identifies one or more potential typographical errors (e.g., spelling errors, grammatical errors, punctuation errors, language errors) in a work (e.g., electronic book) using an initial reference (e.g., dictionary). The computing device sends data indicative of the presence of the potential typographical errors to users. The computing device collects feedback for the work from the users. The feedback for the work indicates whether the potential typographical errors are author-intended strings. The computing device combines the user feedback for the work with user feedback for other works and sorts the combined user feedback based on one or more selected parameters (e.g., by author, by topic, by title). The computing device determines, based on the sorted user feedback, that one or more of the potential typographical errors includes an acceptable string and updates the initial reference to include the acceptable string. In one embodiment, the computing device generates one or more parameter-specific references (e.g., author-specific dictionary, title-specific dictionary, publisher-specific dictionary, topic-specific dictionary) based, at least in part, on the acceptable string.

Embodiments provide an efficient use of auditing resources to identify potential typographical errors by allowing users to expand or decrease the scope of a reference based on author intent. Embodiments continuously update references (e.g., dictionaries, grammatical rules) based on user feedback to provide more accurate results in identifying potential typographical errors (e.g., typographical errors, grammatical errors, punctuation errors, language errors) in works.

Figure 1:
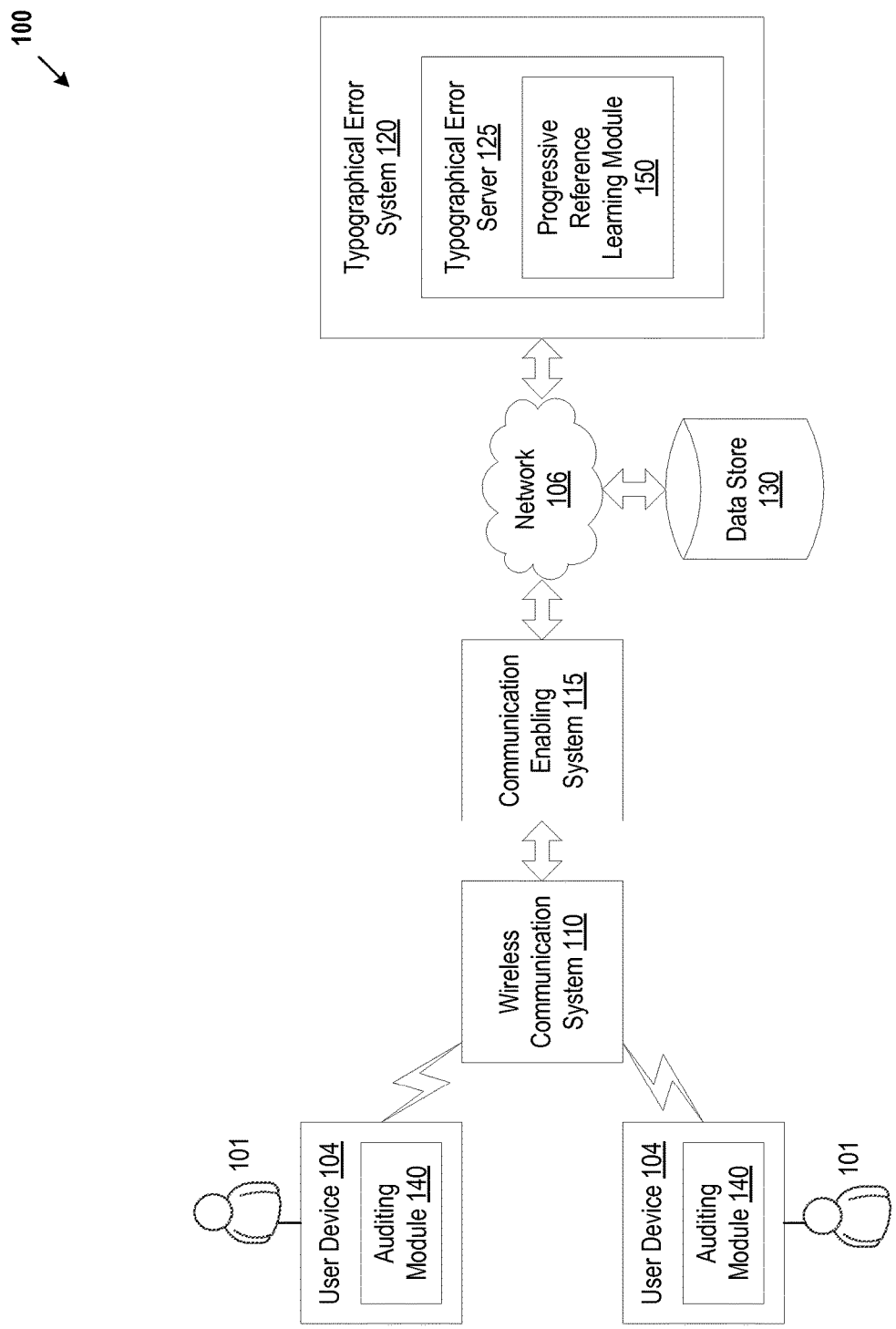
FIG. 1 is a block diagram of an exemplary network architecture, in which embodiments described herein may operate.

FIG. 1 is a block diagram of exemplary network architecture 100, in which embodiments described herein may operate. The network architecture 100 may include a typographical error system 120 and one or more user devices 104 connected via a network 106. Network 106 may be a public network such as the Internet or private a network such as a local area network (LAN) or wide area network (WAN).

The user device 104 may be a portable computing device such as an electronic book reader or a tablet computer (e.g., that includes a book reader application). Other examples of portable computing devices include cellular telephones, personal digital assistants (PDAs), portable media players, netbooks, laptop computers, and the like. The user device 104 may also be other types of computing devices such as a desktop computer, a set-top box, a gaming console, a television, etc. that may not traditionally be considered to be portable.

A user 101 can be any user auditing potential typographical errors in a work. Examples of typographical errors can include, and are not limited to, spelling errors, grammatical errors, punctuation errors, and language errors. A potential typographical error hereinafter refers to one or more strings in a work that are identified as a typographical error based on an initial reference (e.g., dictionary, grammatical rules) and is to be audited by a user 101. A string is a sequence of characters (e.g., alphanumeric characters, symbols, etc.). Examples of a user 101 can include, and are not limited to, an author of a work, a representative of a publisher of a work, and a quality assurance user.

A work hereinafter refers to content, which is created by one or more authors, to be published. Publishing can refer to making author created content available to the general public. Publishing can include distribution of printed works, such as books, newspapers, magazines, journals, etc. Publishing can include electronic distribution of a work to electronic resources, such as electronic books (e-books), websites, blogs, etc.

A work can be a digital media item. The user devices 104 are variously configured with different functionality to enable consumption of one or more types of digital media items. As used herein, a digital media item is defined as an electronic file that can be executed or loaded using software, firmware or hardware configured to present the digital media item to a user. A digital media item typically includes images that can be read by a user and/or audio that can be listened to by the user. Examples of digital media items include electronic books (ebooks), electronic magazines, digital newspapers, digital audio books, electronic journals, real simple syndication (RSS) feeds, digital movies, electronic comic books, digital music, software applications, etc. A digital media item may include a single work or a collection of works. For example, a digital media item may include a single book, or an anthology. Additionally, a single digital media item may include, for example, a written word portion (e.g., an electronic publication).

A data store 130 can store any number of works by any number of authors. A data store 130 can be a persistent storage unit. A persistent storage unit can be a local storage unit or a remote storage unit. Persistent storage units can be a magnetic storage unit, optical storage unit, solid state storage unit, electronic storage units (main memory), or similar storage unit. Persistent storage units can be a monolithic device or a distributed set of devices. A 'set', as used herein, refers to any positive whole number of items.

A typographical error system 120 can communicate with user devices 104 via one or more networks 106 to manage the auditing of works stored in the data store 130 for typographical errors. The typographical error system 120 may reside on one or more machines (e.g., server computers, desktop computers, etc.). A typographical error system 120 can include a network-accessible server-based functionality (typographical error server 125) or other data processing equipment. The data store 130 is accessible by the typographical error system 120. In one embodiment, the typographical error system 120 is maintained by and hosted in a service provider in a service provider environment.

The typographical error server 125 includes a progressive reference learning module 150 that can determine whether potential typographical errors (e.g., spelling errors, punctuation errors, grammatical errors, and language errors) are author-intended strings for a work based on feedback received from the users 101. Examples of an author-intended string can include, and are not limited to, author-intended spelling of one or more strings, author-intended punctuation, author-intended grammar, and author-intended use of one or more foreign language words. The progressive reference learning module 150 can automatically identify potential typographical errors in works and send data indicative of the presence of the potential typographical errors for the works to any number of users 101. The progressive reference learning module 150 can receive feedback from the users 101 indicating whether the potential typographical errors are author-intended strings.

The progressive reference learning module 150 can combine the user feedback for the work with user feedback for other works and sort the combined user feedback, based on a parameter, to determine whether the potential typographical errors are acceptable strings, rather than actual errors. For example, the progressive reference learning module 150 may sort the user feedback by topic. The progressive reference learning module 150 can compile statistics for the sorted user feedback to determine whether the potential typographical errors are acceptable strings. One embodiment of using statistics to determine whether the potential typographical errors are acceptable strings is described in greater detail below in conjunction with FIG. 3.

The progressive reference learning module 150 can automatically create and/or update references to reflect the potential typographical errors that have been identified as acceptable strings. One embodiment of creating and/or updating references is described in greater detail below in conjunction with FIG. 3. The data store 130 can store any number of references. Examples of references can include, and are not limited to, dictionaries and grammatical references. In one embodiment, a grammatical reference includes a set of grammatical rules. The references can be parameter-specific references. Examples of parameters can include, and are not limited to, an author of a work, a title of a work, a publisher of a work, and a topic associated with the work.

For example, a particular science-fiction author may have created a spelling for a fictional planet, such as "Coruscant," for a work (e.g., science-fiction novel). Coruscant may have been identified in the work as a potential typographical error based on a general dictionary. The user feedback for the work may indicate that Coruscant is an author-intended spelling and may associate Coruscant with a science-fiction topic and the particular science-fiction author. The combined feedback for the work and other works may be sorted for the science-fiction topic and statistics for the sorted data may indicate that "Coruscant" is an acceptable string. The progressive reference learning module 150 may update a science-fiction specific dictionary with an entry indicating that Coruscant is an acceptable spelling. The combined feedback for the work and other works may be sorted for the author and statistics for the sorted data may indicate that "Coruscant" is also an acceptable string. The progressive reference learning module 150 may also update an author-specific dictionary for the particular author with an entry for Coruscant. The progressive reference learning module 150 is described in greater detail below with reference to FIG. 2.

Users 101 may communicate with the progressive reference learning module 150 via a user device 104. The user device 104 can include an auditing module 140 to receive the data indicative of the presence of the potential typographical errors for a work from the progressive reference learning module 150 and to present the potential typographical errors and the corresponding indicative data to a user 101 via a user interface in the user device 104. The auditing module 140 can receive user input from the user 101 indicating whether the potential typographical errors are author-intended strings and can provide the user feedback to the progressive reference learning module 150. The auditing module 140 is described in greater detail below with reference to FIG. 4.

Communication between the user device 104 and the typographical error system 120 may be enabled via any communication infrastructure. One example of such an infrastructure includes a combination of a wide area network (WAN) and wireless infrastructure, which allows a user 101 to use the user device 104 to consume items (e.g., digital media items) without being tethered to the typographical error system 120 via hardwired links. The wireless infrastructure may be provided by one or multiple wireless communications systems, such as wireless communications system 110. Wireless communication system 110 may be a wireless fidelity (WiFi) hotspot connected with the network 106. Wireless communication system 110 may also be a wireless carrier system that can be implemented using various data processing equipment, communication towers, etc. Alternatively, or in addition, the wireless carrier system may rely on satellite technology to exchange information with the user device 104.

The communication infrastructure may also include a communication-enabling system 115 that serves as an intermediary in passing information between the typographical error system 120 and the wireless communication system 110. The communication-enabling system 115 may communicate with the wireless communication system 110 (e.g., a wireless carrier) via a dedicated channel, and may communicate with the typographical error system 120 via a non-dedicated communication mechanism (e.g., a public Wide Area Network (WAN) such as the Internet).

Figure 2:
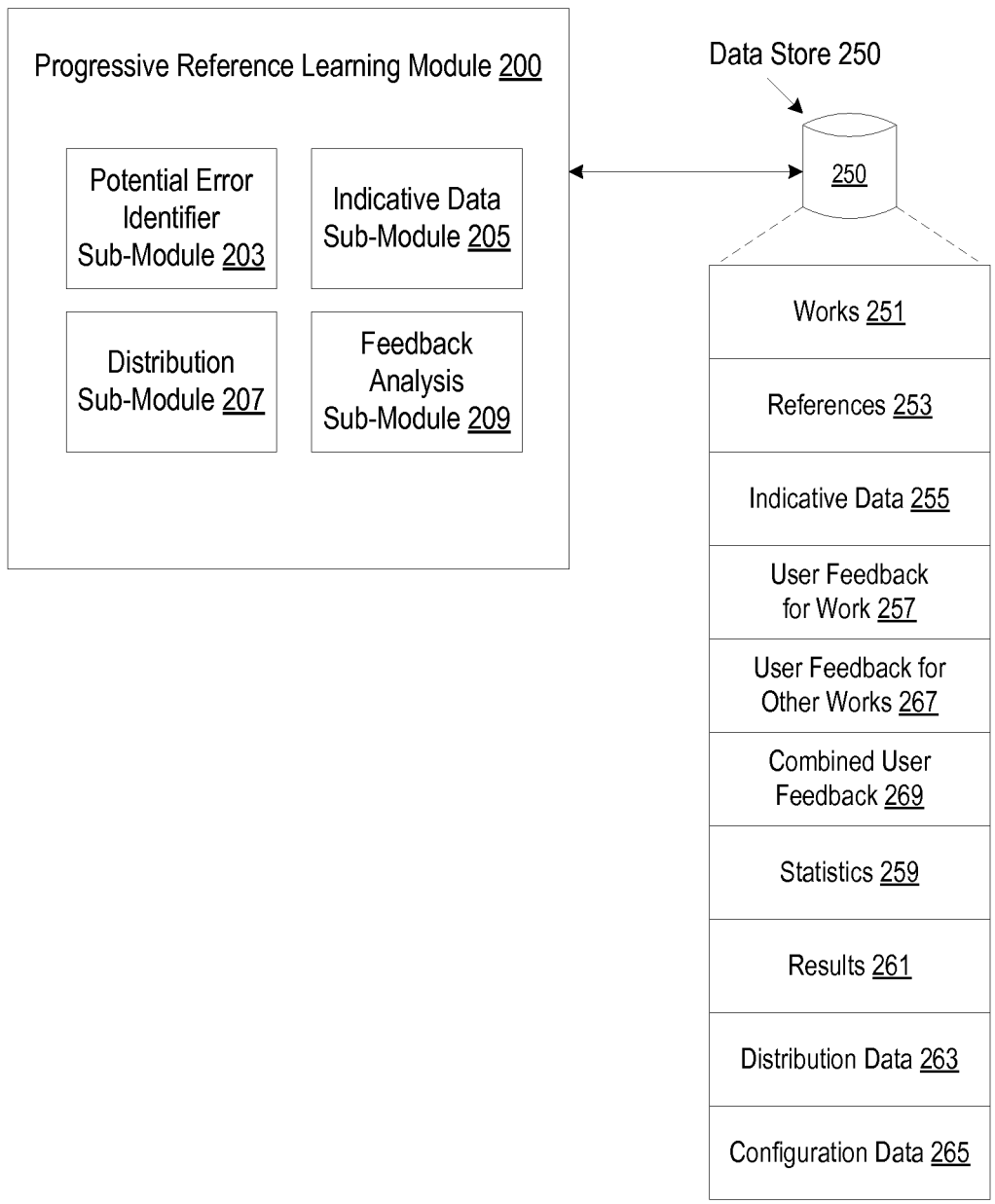
FIG. 2 is a block diagram of one embodiment of a progressive reference learning module.

FIG. 2 is a block diagram of one embodiment of a progressive reference learning module 200, which may correspond to the progressive reference learning module 150 of FIG. 1. In one embodiment, the progressive reference learning module 200 includes a potential error identifier sub-module 203, an indicative data sub-module 205, a distribution sub-module 207, and a feedback analysis sub-module 209. In alternative embodiments, one or more of these sub-modules may be combined into a single sub-module. Additionally, the functionality of any of these sub-modules may be separated into multiple distinct sub-modules.

The potential error identifier sub-module 203 can analyze a work 251 to identify one or more potential typographical errors in the work 251. A data store 250, which is accessible by the progressive reference learning module 200, can store any number of works 251. The data store 250 can store data for each work that associates a work with one or more parameters. Examples of a parameter can include, and are not limited to an author of a work, a title of a work, a publisher of a work, and a topic associated with the work. In one embodiment, the data store 250 is coupled to the progressive reference learning module 200. A data store 250 can be a persistent storage unit. A persistent storage unit can be a local storage unit or a remote storage unit. Persistent storage units can be a magnetic storage unit, optical storage unit, solid state storage unit, electronic storage units (main memory), or similar storage unit. Persistent storage units can be a monolithic device or a distributed set of devices. A 'set', as used herein, refers to any positive whole number of items.

The potential error identifier sub-module 203 can use a reference 253 that is stored in the data store 250 to identify the one or more potential typographical errors in a work 251. Examples of a reference 253 can include, and are not limited to, a dictionary and a grammatical reference. In one embodiment, a grammatical reference is a set of grammatical rules. The potential error identifier sub-module 203 can apply the set of grammatical rules to a work 251 to identify one or more potential typographical errors in a work 251. A reference 253 can be a general reference or a parameter-specific reference (e.g., author-specific dictionary, title-specific dictionary, publisher-specific dictionary, topic-specific dictionary). The potential error identifier sub-module 203 can compare the content (e.g., strings) of a work 251 to entries in a dictionary. The potential error identifier sub-module 203 can identify strings in the work that do not match any entries in the dictionary as potential typographical errors.

The indicative data sub-module 205 can create data 255 indicative of the potential typographical errors in the work 251, which has been analyzed by the potential error identifier sub-module 203. The indicative data 255 can be a data structure. The indicative data 255 can include an entry for each potential typographical error that has been identified in the work 251. A potential typographical error can include any number of strings in a work. Entries in the indicative data 255 can include, for example, and not limited to, the one or more strings identified as the potential typographical error, the position (e.g., byte offset) of the string(s) in the work, and the context for the string(s) in the work. A string is a sequence of characters (e.g., alphanumeric characters, symbols, etc.). Examples of the context can include, and are not limited to, a sentence that includes the string(s), a paragraph that includes the string(s), a page of the work that includes the string(s), a number of words that precede and/or follow the string(s). The data store 250 can store indicative data 255 for any number of works 251.

The distribution sub-module 207 can provide the indicative data 255 for a work 251 to user devices for one or more auditors to use to audit the potential typographical errors for the work. The distribution sub-module 207 can access distribution data 263 that is stored in the data store 250 to determine which users and/or user devices to send the indicative data 255 to. The distribution data 263 can include a mapping of works 251 to users and/or user devices. The distribution data 263 can be user defined. The distribution sub-module 207 can track which users and/or user devices have received the indicative data 255 for a work 251 in the distribution data 263. The distribution data 263 can be a data structure that includes for example, and not limited to, a user identifier, a user device identifier, and a work identifier.

The feedback analysis sub-module 209 can receive user feedback 257 for the work from the users and can store the user feedback 257 in the data store 250. The data store 250 can store user feedback 267 for other works. The feedback analysis sub-module 209 can combine the user feedback 257 for the work with user feedback 267 for the other works. The feedback analysis sub-module 209 can sort the combined user feedback 269 based on a parameter (e.g., author, title, publisher, and topic). The feedback analysis module 209 can determine which parameters to use based on configuration data 265 that is stored in the data store 250 and can sort the combined user feedback 269 for the selected parameters. The configuration data 265 can be user-defined. The user feedback 257,267,269 can include, for example, and not limited to a user identifier, a work identifier, at least one string identified as a potential typographical error, a position (e.g., byte offset) of the string in the work, a decision indicating whether the corresponding string is an author-intended string, at least one parameter associated with the corresponding string, and other information related to the decision, including, but not limited to, a confidence level of the decision.

The feedback analysis sub-module 209 can compile one or more statistics 259 for the sorted user feedback and use the statistic(s) 259 to determine whether a potential typographical error is an acceptable string and store the determination as a result 261 in the data store 250. Examples of a statistic 259 can include, and are not limited to, a number of times users mark a potential typographical error in the sorted user feedback as an author-intended string, a number of times a subset of users marks a potential typographical error in the sorted user feedback as an author-intended string, a total number of times a potential typographical error is marked in the sorted user feedback as an author-intended string, a percentage of the sorted user feedback that marked the potential typographical error as an author-intended string, a percentage of the users that marked the potential typographical error as an author-intended string, a number of times each potential typographical error is marked as an author-intended string for a parameter, etc. The statistics 259 can be stored in the data store 250.

The feedback analysis sub-module 209 can determine whether one or more of the statistics 259 satisfy a threshold that is stored in the configuration data 265. For example, the feedback analysis sub-module 209 can determine whether a statistic 259 exceeds a threshold. One embodiment of determining whether the potential typographical errors include an acceptable string using the statistics is described in greater detail below in reference to FIG. 3. If the potential typographical error in a work (e.g., book) is not an acceptable string (e.g., a commonly accepted spelling) based on the statistics 259, the feedback analysis sub-module 209 can associate, based on the user feedback 257,267, an alternative string with an actual error. If the potential typographical error in a work (e.g., book) is an acceptable string (e.g., a commonly accepted spelling) based on the statistics 259, the feedback analysis sub-module 209 can modify one or more references 253 (e.g., dictionary) to include the acceptable string. The reference 253 can be a general reference or a parameter-specific reference. One embodiment of modifying a reference is described in greater detail below in conjunction with FIG. 3. The modified reference 253 can be used to identify potential typographical errors in works 251.

The feedback analysis sub-module 209 can identify, for example, using the user feedback 257,267, one or more parameters (e.g., author, title, publisher, and topic) that are associated with the acceptable strings and can update the references 253 that correspond to the parameters to represent the acceptable strings. One embodiment of updating a parameter-specific reference is described in greater detail below with reference to FIG. 3.

For example, a science-fiction term in a work by a particular science-fiction author is detected one hundred twelve times in the work. The threshold may be that at least 75% of the sorted combined user feedback 257 should indicate that the particular science-fiction term is an author-intended string in order to satisfy the threshold. If the statistic 259 exceeds the threshold, the feedback analysis sub-module 209 can update a science-fiction dictionary and/or a dictionary for the particular science-fiction author to represent the acceptable string for the particular science-fiction term.

Figure 3:
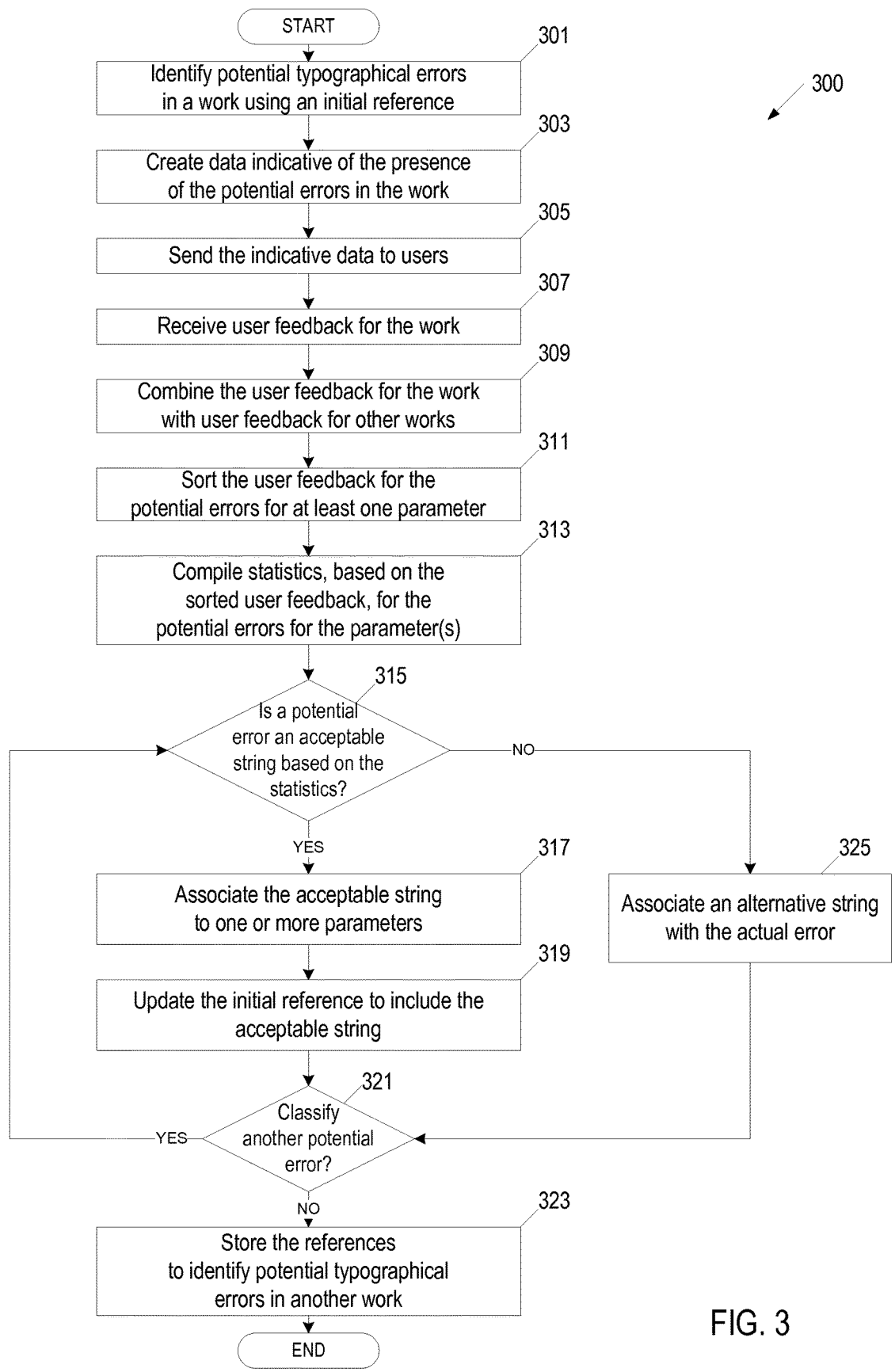
FIG. 3 is a flow diagram of an embodiment of a method for progressively improving typographical error detection based on author intent.

FIG. 3 is a flow diagram of an embodiment for a method 300 of progressively improving typographical error detection based on author intent. The method 300 may be performed by processing logic that may comprise hardware (circuitry, dedicated logic, etc.), software (such as is run on a general purpose computer system or a dedicated machine), or a combination of both. In some embodiments, the method 300 is performed by a typographical error system (e.g., by a progressive reference learning dictionary module 150 running on typographical error system 120 of FIG. 1).

At block 301, processing logic identifies one or more potential typographical errors in a work using an initial reference. Examples of a reference can include, and are not limited to, a dictionary and a grammatical reference. An initial reference can be of any language. An initial reference can include, and is not limited to, a published reference (e.g., Webster's Dictionary, Oxford Dictionary of English, etc.), an online reference (e.g., online dictionary), etc. An initial reference can be a parameter-specific reference that is created by the progressive reference learning module and stored in a data store that is coupled to the progressive reference learning module. Examples of a parameter-specific reference can include, and are not limited to, a topic-specific reference, an author-specific reference, a title-specific reference, and a publisher-specific reference. In one embodiment, processing logic can receive a selection of the initial reference (e.g., a parameter-specific dictionary, a published dictionary, an online dictionary) to be used to identify the potential typographical errors.

At block 303, processing logic creates and stores data indicative of the potential typographical errors in the work. The indicative data can include, and is not limited to, the one or more strings identified as the potential typographical error, the position (e.g., byte offset) of the string(s) in the work, and the context for the string(s) in the work. Examples of the context can include, and are not limited to, a sentence that includes the string(s), a paragraph that includes the string(s), a page of the work that includes the string(s), a number of words that precede and/or follow the string(s). At block 305, processing logic sends the indicative data for the potential typographical errors to at least one user (e.g., author, publisher representative, quality assurance user).

At block 307, processing logic receives user feedback for the potential typographical errors for the work. The user feedback for the work indicates whether or not a user has identified a potential typographical error as an author-intended string. The user feedback can include, for example, and not limited to, a user identifier, a work identifier, at least one string identified as a potential typographical error, a position (e.g. by offset) of the string in the work, a decision indicating whether the corresponding string is an author-intended string, a confidence level of the decision, at least one parameter associated with a corresponding author-intended string, and an alternative string for a corresponding actual error.

At block 309, processing logic combines the user feedback for the work with user feedback for other works. The user feedback for other works can be stored in the data store. At block 311, processing logic sorts the combined user feedback for at least one parameter. Examples of a parameter can include, and are not limited to, a topic, an author, a title, and a publisher. In one embodiment, processing logic determines which parameter(s) to use based on configuration data that is stored in a data store. Examples of topics can include, and are not limited to, dialog, medical, medieval, fantasy, science fiction, mathematical, an author-defined topic, a topic associated with a Book Industry Standards and Communications (BISAC) code, etc. The BISAC Subject Headings List, also known as the BISAC Subject Codes List or BISAC Code, is a standard used by many companies to categorize books based on topical content.

For example, processing logic sorts the combined user feedback by author. In another example, processing logic sorts the combined user feedback by topic. Processing logic can use one or more parameters to sort the combined user feedback. For example, author may have multiple works in several topics, and processing logic sorts the combined user feedback by author and by topic.

At block 313, processing logic compiles, based on the sorted user feedback, one or more statistics for the potential typographical errors for the parameter(s). Examples of statistics can include, and are not limited to, a number of times users mark potential typographical errors in the user feedback as an author-intended strings, a number of times a subset of users mark potential typographical errors in the user feedback as an author-intended strings, a total number of times the potential typographical errors are marked in the user feedback as an author-intended strings, a percentage of the user feedback that marked the potential typographical errors as author-intended strings, a percentage of the users that marked the potential typographical errors as an author-intended strings, a number of times the potential typographical errors are marked as an author-intended strings for one or more parameters, etc. For example, processing logic can determine the number of times each potential typographical error is marked as an author-intended string for a specific author, specific title, specific publisher, specific topic (e.g., dialog, medical, medieval, fantasy, science fiction, mathematical). The statistics can be compiled for each potential typographical error.

Processing logic can compile statistics for any number of parameters. For example, processing logic may sort the user feedback for a specific title and compile statistics for the specific title. In another example, processing logic may sort the user feedback stored in the data store based on the science-fiction topic and create statistics based on the science-fiction topic.

At block 315, processing logic determines whether a potential typographical error is an acceptable string by determining whether the one or more statistics satisfy a threshold. For example, processing logic determines whether a percentage statistic exceeds a threshold percentage. For example, processing logic determines whether the potential typographical error is a generally accepted correct spelling in the combined user feedback that is sorted for the one or more parameters. Processing logic may sort the combined user feedback by author and compile a statistic indicating that 85% of the sorted combined user feedback identifies the potential typographical error is a generally accepted correct spelling. The threshold percentage may be 70%. Processing logic determines that the statistic (e.g., 85%) exceeds the threshold percentage and determines that potential typographical error is a generally accepted correct spelling in groups of books for the same author. The threshold can be user-defined. The threshold can be stored in configuration data that is stored in the data store. If the potential typographical error is an acceptable string (block 315), processing logic associates, based on the user feedback, the acceptable string(s) with one or more parameters at block 317.

The parameter-based references may have a hierarchical nature. For example, there may be three levels in a hierarchy. For example, there may be a global level dictionary, a topic level dictionary, and an author level dictionary. Processing logic may associate the acceptable string(s) with one or more parameter-based references in the hierarchy based on the user feedback at block 317. For example, processing logic may sort the combined user feedback based on the title "*The Day the Earth Stood Still*." Processing logic may identify that a certain potential typographical error (e.g., the phrase "Klaatu barada nikto") is an acceptable string at the title level for the title "*The Day the Earth Stood Still*." Processing logic may associate "Klaatu barada nikto" with a title-based dictionary.

Processing logic may sort the combined user feedback for the topic "science-fiction." Processing logic may then determine that the same potential typographical error (e.g., the phrase "Klaatu barada nikto") is an acceptable string at a higher level in the hierarchy, for example, at the science-fiction topic level. Processing logic may associate "Klaatu barada nikto" with a topic-based dictionary, such as a science-fiction based dictionary. Processing logic may also determine that the same potential typographical error (e.g., the phrase "Klaatu barada nikto") is not an acceptable string at a more global level in the hierarchy, for example, at non-science-fiction topics level. Processing logic may not associate "Klaatu barada nikto" with other topic-based dictionaries or the global dictionary.

At block 319, processing logic updates the initial reference to include the acceptable string. In one embodiment, processing logic can generate one or more parameter-specific references based, at least in part, on the modifications to the initial reference. Generating a parameter-specific reference can include creating a parameter-specific reference and updating an existing parameter-specific reference. For example, the initial dictionary is an existing parameter-specific reference and processing logic modifies the existing parameter-specific reference to represent the acceptable string. In another example, the initial reference is a standard dictionary and processing logic modifies the standard dictionary to include the acceptable string and creates a parameter-specific dictionary.

Processing logic can modify a grammatical reference by updating one or more grammatical rules associated with the grammatical reference. Processing logic can modify a dictionary (e.g., parameter-specific dictionary, standard dictionary) by adding an entry to the dictionary for the string. For example, the user feedback for a work and/or the user feedback for the other works may include a topic that is associated with the string. The topic can be a user selected topic. The topic can be based on a code (e.g., BISAC code) that is associated with the string. For example, a fictional author Jane Doe may have included dialog in a work titled "XYZ" that illustrates a speaker is sleepy. The dialog may illustrate a speaker is slurring words and speaking incoherently. Sentences in XYZ may include potential typographical errors (e.g., grammatical errors, spelling errors, punctuation errors, and language errors) as identified based on rules from an initial grammatical reference and/or an initial dictionary. The user feedback for the XYZ work may indicate that the author, Jane Doe, intended the grammatical errors and typos. Processing logic may determine from the combined user feedback, which may be sorted by author, that the potential typographical errors include an acceptable string. Processing logic may update an author-specific dictionary (e.g., dictionary associated with Jane Doe) with one or more entries to include the acceptable string. Processing logic may determine from the combined user feedback, which may be sorted by title, that the potential typographical errors include an acceptable string. Processing logic may also update the grammatical rules in a title-specific grammatical reference (e.g., XYZ grammatical reference) to allow for certain exceptions to the rules.

If the potential typo is not an acceptable string (block 315), but an actual error (block 315), processing logic associates an alternative string with the actual error at block 325, according to some embodiments. The user feedback for the work can include, for example, a corrected spelling for the string. In one embodiment, the user is presented with a list of alternative strings which the user may select from.

At block 321, processing logic determines whether there is another potential typographical error in a work to classify as an acceptable string or an actual error. If there is another potential typographical error to classify, processing logic returns to block 315 to determine, based on the statistics, whether a next potential typographical error in a work is an acceptable string. If there is not another potential typographical error in a work to classify, processing logic stores the references (e.g., modified initial reference, parameter-specific reference) to identify one or more potential typographical errors in another work at block 323.

Method 300 can be an iterative method to progressively update and train the parameter-specific references. For example, when processing logic identifies potential typographical errors in a work, processing logic can use a recently updated parameter-specific reference to more accurately identify the potential typographical errors in a work. The number of iterations can be based on the number of users providing feedback for a work.

Figure 4:
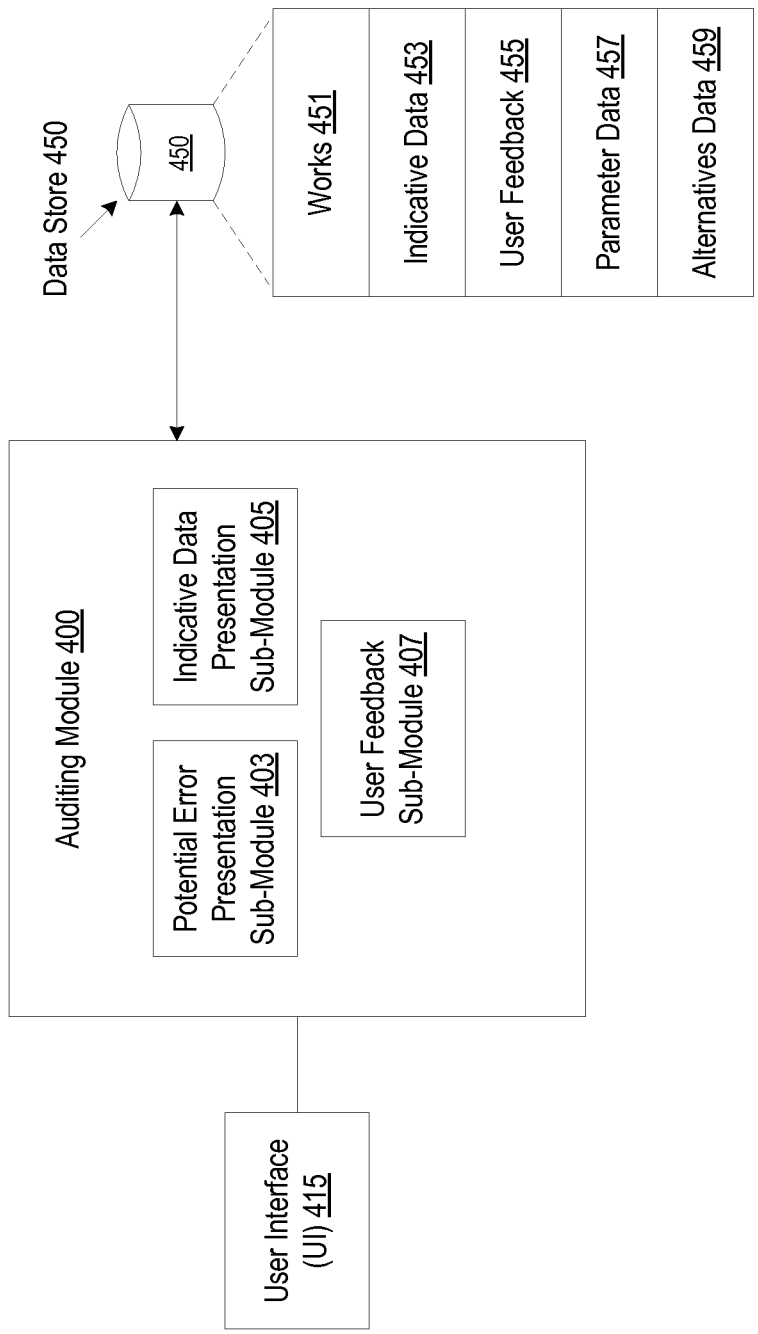
FIG. 4 is a block diagram of one embodiment of an auditing module.

FIG. 4 is a block diagram of one embodiment of an auditing module 400, which may correspond to the auditing module 140 of FIG. 1. In one embodiment, the auditing module 400 includes a potential error presentation sub-module 403, an indicative data presentation sub-module 405, and an auditor feedback sub-module 407. In alternative embodiments, one or more of these sub-modules may be combined into a single sub-module. Additionally, the functionality of any of these sub-modules may be separated into multiple distinct sub-modules.

The auditing module 400 can receive a work 451 and data 453 indicative of the potential typographical errors in the work 451, for example, from a progressive reference learning module, and store the work 451 and the corresponding indicative data 453 in a data store 450 that is accessible by the auditing module 400. The indicative data 453 can be a data structure. The indicative data 453 can include a work identifier. The indicative data 453 can include entries for the potential typographical errors that have been identified in the work 451. The entries in the indicative data 453 can include, for example, and not limited to, the one or more strings identified as the potential typographical error, the position (e.g., byte offset) of the string(s) in the work, and the context for the string(s) in the work.

The data store 450 can store indicative data 453 for any number of works 451. In one embodiment, the data store 450 is coupled to the auditing module 400. A data store 450 can be a persistent storage unit. A persistent storage unit can be a local storage unit or a remote storage unit. Persistent storage units can be a magnetic storage unit, optical storage unit, solid state storage unit, electronic storage units (main memory), or similar storage unit. Persistent storage units can be a monolithic device or a distributed set of devices. A 'set', as used herein, refers to any positive whole number of items.

The potential error presentation sub-module 403 can use the indicative data 453 for a work 451 to identify the potential typographical errors for the work 451. In one embodiment, the potential error presentation sub-module 403 presents a list of the potential typographical errors for a work in a user interface (UI) 415. The UI 415 can be a graphical user interface. In one embodiment, the potential error presentation sub-module 403 presents the work 451 in a UI 415 and highlights the potential typographical errors in the work 451 in the UI 415.

The indicative data presentation sub-module 405 can present the indicative data 453 for a selected potential typographical error in the UI 415. In one embodiment, the indicative data presentation sub-module 405 detects a user selection of a potential typographical error and provides the indicative data 453 that corresponds to the selected potential typographical error in the UI 415.

The user feedback sub-module 407 can receive user input indicating whether a potential typographical error is an author-intended string or an actual error. In one embodiment, the user feedback sub-module 407 provides UI elements (e.g., text box, drop-down menu, buttons, text fields, etc.) in the UI 415 to receive the user input.

The user feedback sub-module 407 can receive user input of one or more parameters to associate with an author-intended string. Examples of parameters can include, and are not limited to, a topic, a title, an author, and a publisher. In one embodiment, the user feedback sub-module 407 provides a list of parameters from parameter data 457 (e.g., list of authors, list of publishers, list of titles, list of topics) stored in the data store 450 in the UI 415 and receives a user selection of one or more parameters.

The user feedback sub-module 407 can receive user input of an alternative string (e.g., corrected spelling) for an actual error. In one embodiment, the user feedback sub-module 407 provides a list of alternative strings from alternatives data 459 stored in the data store 450 in the UI 415 and receives a user selection of an alternative string. The user feedback sub-module 407 can store the user feedback 455 in the data store 450. The user feedback sub-module 407 can provide the user feedback 455 for the work 451 to the progressive reference learning module.

Figure 5:
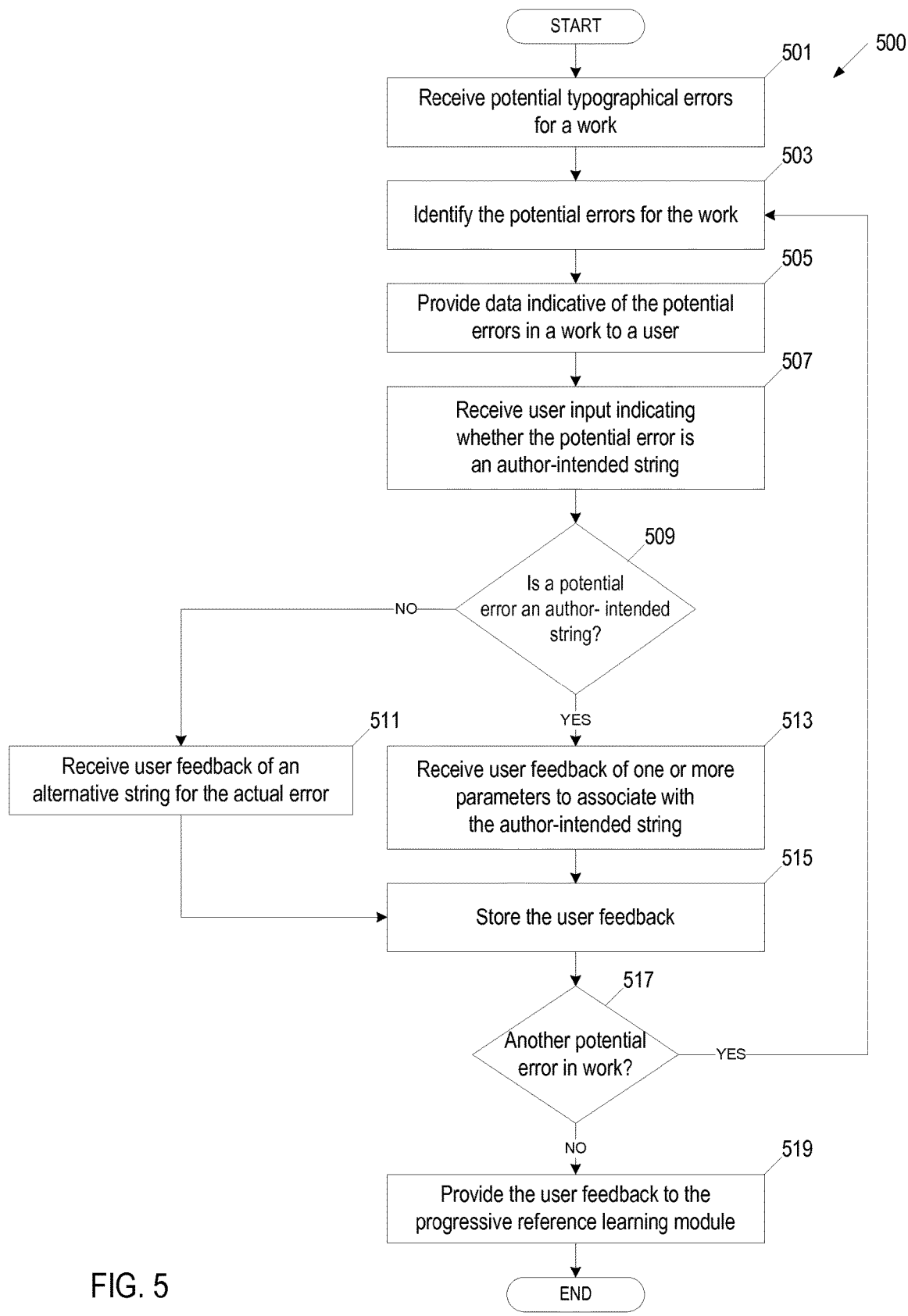
FIG. 5 is a flow diagram of an embodiment of a method for providing user feedback for potential typographical errors based on author intent.

FIG. 5 is a flow diagram of an embodiment of a method 500 for providing user feedback for potential typographical errors based on author intent. The method 500 may be performed by processing logic that may comprise hardware (circuitry, dedicated logic, etc.), software (such as is run on a general purpose computer system or a dedicated machine), or a combination of both. In some embodiments, the method 500 is performed by a user device (e.g., by an auditing module 140 running on a user device 104 of FIG. 1).

At block 501, processing logic receives a work and data indicative of the potential typographical errors in the work. Processing logic can store the work and the corresponding indicative data in a data store. At block 503, processing logic identifies, based on the indicative data, at least one potential typographical error for the work. For example, processing logic use the positions in the indicative data to highlight the potential typographical errors in a work in a graphical user interface (GUI). An example of a GUI can be, and is not limited to, an e-book graphical user interface, a browser, a mobile device application, etc. In one embodiment, processing logic uses the strings in the indicative data to provide a list of the potential typographical errors for the work.

At block 505, processing logic provides the indicative data for the potential typographical errors. In one embodiment, processing logic provides the indicative data in the GUI, for example, by displaying the indicative data in the GUI. For example, when a user (e.g., author, publisher representative, quality assurance user) selects one of the potential typographical errors that are highlighted in the work in an e-book GUI, processing logic can include a pop-up window containing the indicative data that corresponds to the selected potential typographical error in the GUI. The indicative data can include and is not limited to, the one or more strings identified as the potential typographical error, the position (e.g., byte offset) of the string(s) in the work, and the context for the string(s) in the work. Examples of the context can include, and are not limited to, a sentence that includes the string(s), a paragraph that includes the string(s), a page of the work that includes the string(s), a number of words that precede and/or follow the string(s).

At block 507, processing logic receives user input indicating whether a potential typographical error is an author-intended string or an actual error. A user can use the indicative data to make a determination of whether an author-intended the potential typographical error. For example, the user may use the position (e.g., byte offset) data in the indicative data to lookup the potential typographical error in the work. In another example, the user may use the context of the potential typographical error to determine whether the potential typographical error is an author-intended string. In one embodiment, processing logic provides UI elements in the GUI to receive the user input indicating whether a potential typographical error is an author-intended string. Examples of GUI elements can include, and are not limited to, text box, drop-down menu, buttons, text fields, etc. For example, a user selects "author-intended string" or "actual error" from a drop-down menu.

If the potential typographical error is an author-intended string (block 509), processing logic receives user feedback of one or more parameters to associate with the author-intended string at block 513. Processing logic can include UI elements in the GUI to receive the user selection of the one or more parameters. Examples of parameters can include, and are not limited to, a topic, a title, an author, and a publisher. In one embodiment, processing logic provides a list of parameters in a GUI and receives a user selection of the one or more parameters. For example, processing logic provides a list of topics in a GUI and receives a user selection of one or more topics. Examples of topics can include, and are not limited to, dialog, medical, medieval, fantasy, science fiction, mathematical, an author-defined topic, BISAC code. Examples of UI elements can include, and are not limited to, text box, drop-down menu, buttons, text fields, etc.

If the potential typographical error is not an author-intended string (block 509), processing logic receives user feedback of an alternative string for the actual error at block 511. Processing logic may receive, for example, and not limited to, a corrected spelling for the actual typo, an alternative string to associate with the actual typo, etc. In one embodiment, processing logic provides a list of alternative strings in a GUI and receives a user selection of an alternative string. Processing logic can include UI elements in the GUI to receive the user input for the actual typo. Examples of UI elements can include, and are not limited to, text box, drop-down menu, buttons, text fields, etc.

At block 515, processing logic stores the user feedback in a data store that is accessible by the auditing module. The user feedback can include, for example, and not limited to a user identifier, a work identifier, at least one string identified as a potential typographical error, a position of the at least one string in a work, a decision indicating whether the corresponding string is an author-intended string, a confidence level of the decision, or at least one parameter associated with the corresponding string. The user feedback can be data received from a user and/or data from the indicative data for the work.

At block 517, processing logic determines whether there is another potential typographical error in the work for a user to audit. If there is another potential typographical error, processing logic returns to block 503 to identify a next potential typographical error in the work. For example, a user may wish to view a next paragraph or a next page in the work in the GUI and processing logic can highlight any potential typographical errors in the next paragraph or the next page.

If there is not another potential typographical error (block 517), processing logic provides the user feedback for the work to the progressive reference learning module at block 519. The user feedback can be a data structure. The user feedback can include a work identifier and a user identifier. The user feedback can contain an entry for each potential typographical error. Each entry can include fields, such as, and not limited to, a string identified as a potential typographical error, a decision indicating whether the corresponding string is an author-intended string or an actual error, one or more parameters associated with the corresponding author-intended string, and an alternative string associated with an actual error. The progressive reference learning module can receive and use the user feedback to update and/or create one or more parameter-specific references.

Figure 6:
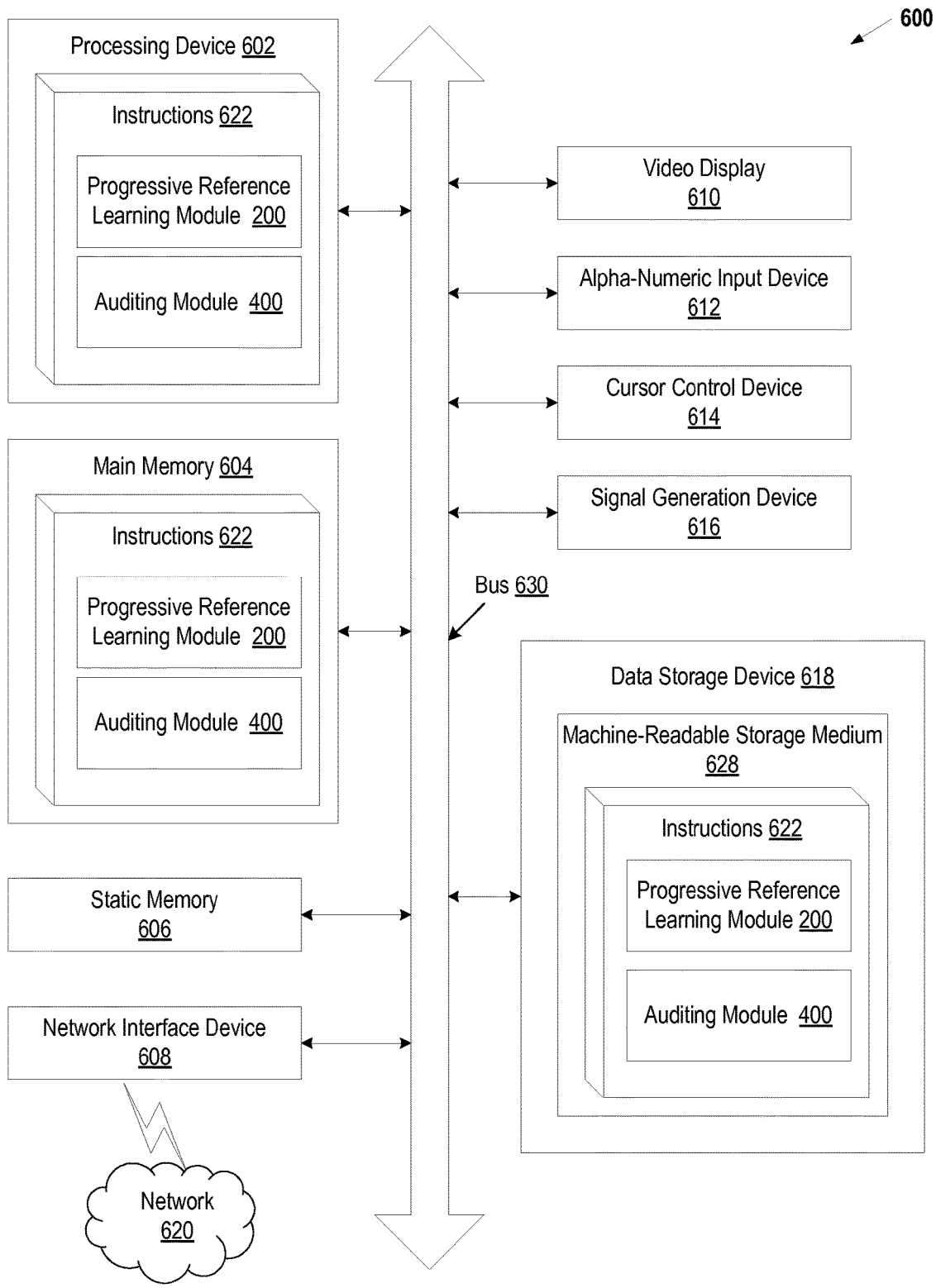
FIG. 6 is a block diagram illustrating an exemplary computing device, in accordance with some embodiments.

FIG. 6 is a block diagram illustrating an exemplary computing device 600. In one embodiment, the computing device corresponds to the typographical error system 120 hosting the progressing typographical learning module 150 of FIG. 1. In one embodiment, the computing device corresponds to the user device 140 hosting the auditing module 140 of FIG. 1. The computing device 600 includes a set of instructions for causing the machine to perform any one or more of the methodologies discussed herein. In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 600 includes a processing system (processing device) 602, a main memory 604 (e.g., read-only memory (ROM), flash memory, dynamic random access memory (DRAM) such as synchronous DRAM (SDRAM), etc.), a static memory 606 (e.g., flash memory, static random access memory (SRAM), etc.), and a data storage device 618, which communicate with each other via a bus 630.

Processing device 602 represents one or more general-purpose processing devices such as a microprocessor, central processing unit, or the like. More particularly, the processing device 602 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 602 may also be one or more special-purpose processing devices such as an application specific integrated circuit (ASIC), a field programmable gate array (FPGA), a digital signal processor (DSP), network processor, or the like. In one embodiment, the processing device 602 is configured to execute the progressive typographical learning module 200 for performing the operations and steps discussed herein. In one embodiment, the processing device 602 is configured to execute the auditing module 400 for performing the operations and steps discussed herein.

The computer system 600 may further include a network interface device 608. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 616 (e.g., a speaker).

The data storage device 618 may include a machine-readable storage medium 628 (computer readable storage medium) on which is stored one or more sets of instructions 622 (e.g., instructions of progressive reference learning module 200, instructions of auditing module 400) embodying any one or more of the methodologies or functions described herein. The progressive typographical learning module 200 and auditing module 400 may also reside, completely or at least partially, within the main memory 604 and/or within the processing device 602 during execution thereof by the computer system 600, the main memory 604 and the processing device 602 also constituting computer-readable media. The progressive reference learning module 200 and auditing module 400 may further be transmitted or received over a network 620 via the network interface device 608.

While the computer-readable storage medium 628 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

In the above description, numerous details are set forth. It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying," "sending," "collecting," "sorting," "determining," "updating," "generating," "associating," "adding," "compiling," "receiving," "updating," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage devices.

Embodiments of the invention also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic or optical cards, or any type of media suitable for storing electronic instructions.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
    identifying, by a processing device, a potential typographical error in a work using an initial reference, wherein the work comprises a plurality of words;
    sending, by the processing device, data indicative of presence of the potential typographical error in the work to a plurality of users;
    receiving, by the processing device, feedback for the work from the plurality of users, the feedback comprising an indicator that specifies that the potential typographical error is an author-intended string for the work, wherein the author-intended string comprises at least one of an author-intended spelling of one or more words, an author-intended punctuation, an author-intended grammar, or an author-intended use of one or more foreign language words;
    combining, by the processing device, the feedback from the plurality of users for the work with feedback for a plurality of additional works to generate a combined feedback;
    sorting, by the processing device, the combined feedback based on one or more selected parameters associated with the work to generate a sorted feedback, wherein the one or more selected parameters comprises at least one of an author associated with the work, a title associated the work, a topic associated with the work, or a publisher associated with the work;
    determining, by the processing device and based on the sorted feedback, that the potential typographical error comprises an acceptable string; and
    updating, by the processing device, the initial reference to include the acceptable string.

2. The method of claim 1, wherein determining that the potential typographical error comprises an acceptable string comprises:
    determining a percentage of the sorted feedback that identifies the potential typographical error as an author-intended string;
    determining that the percentage exceeds a threshold percentage; and
    identifying the potential typographical error as an acceptable string.

3. The method of claim 2, further comprising:
    determining that the percentage does not exceed the threshold percentage;
    identifying the potential typographical error as an actual error; and
    associating an alternative string with the actual error.

4. The method of claim 1, further comprising:
    generating one or more parameter-specific references based, at least in part, on the acceptable string.

5. The method of claim 4, wherein generating one or more parameter-specific references comprises:
    determining, based on the sorted feedback, one or more parameters that are associated with the acceptable string;
    identifying a parameter-specific reference that corresponds to each of the one or more parameters associated with the acceptable string, wherein the one or more parameter-specific references comprises at least one of an author-specific reference, a title-specific reference, a topic-specific reference, or a publisher-specific reference.

6. The method of claim 1, wherein updating the initial reference comprises:
adding a string to the initial reference to represent the acceptable string.

7. The method of claim 1, wherein the feedback for the work comprises at least one of a user identifier, a work identifier, at least one string identified as a potential typographical error, a position of the at least one string in a work, a decision indicating whether a corresponding string is an author-intended string, a confidence level of the decision, or at least one parameter associated with the corresponding string.

8. The method of claim 1, wherein determining that the potential typographical error comprises an acceptable string comprises:
compiling, based on the sorted feedback, one or more parameter-specific statistics;
determining that at least one of the one or more parameter-specific statistics exceeds a threshold; and
identifying the potential typographical error as an acceptable string.

9. The method of claim 8, wherein the one or more parameter-specific statistics comprises at least one of a number of times users mark a potential typographical error as an author-intended string, a total number of times a potential typographical error is marked as an author-intended string, a percentage of feedback that marked the potential typographical error as an author-intended string, a percentage of users that marked the potential typographical error as an author-intended string, or a number of times the one or more potential typographical errors are marked as an author-intended string for a parameter.

10. A non-transitory computer-readable medium having instructions stored thereon which, when executed by a processing device, cause the processing device to perform operations comprising:
receiving, by the processing device, feedback from a plurality of users for one or more potential typographical errors identified in a work, the feedback comprising an indicator that specifies that at least one of the one or more potential typographical errors are author-intended strings for the work, wherein the work comprises a plurality of words and wherein the author-intended strings comprise at least one of an author-intended spelling of one or more words, an author-intended punctuation, an author-intended grammar, or an author-intended use of one or more foreign language words;
determining, by the processing device and based at least in part on the indicator received in the feedback for the work, that one or more of the potential typographical errors is an author-intended string;
combining, by the processing device, the feedback from the plurality of users for the work with feedback for a plurality of additional works to generate a combined feedback;
sorting, by the processing device, the combined feedback based on one or more selected parameters associated with the work to generate a sorted feedback, wherein the one or more selected parameters comprises at least one of an author associated with the work, a title associated the work, a topic associated with the work, or a publisher associated with the work; and
updating, by the processing device and based on the sorted feedback, one or more parameter-specific references using the author-intended string.

11. The non-transitory computer-readable medium of claim 10, wherein updating one or more parameter-specific references using the author-intended string comprises:
determining, based on the sorted feedback, a first percentage of the feedback that identifies a first potential typographical error of the one or more potential typographical errors as an author-intended string;
determining that the first percentage exceeds a threshold percentage;
identifying the first potential typographical error as an acceptable string; and
adding a string to the one or more parameter-specific references to represent the acceptable string.

12. The non-transitory computer-readable medium of claim 11, wherein adding a string to the one or more parameter-specific references comprises:
for each acceptable string, determining, based on the combined sorted feedback, one or more parameters that are associated with the acceptable string; and
identifying a parameter-specific reference that corresponds to each of the one or more parameters associated with the acceptable string.

13. The non-transitory computer-readable medium of claim 11, the operations further comprising:
determining, based on the sorted feedback, a second percentage of the feedback that identifies a second potential typographical error of the one or more potential typographical errors as an author-intended string;
determining that the second percentage does not exceed the threshold percentage;
identifying the second potential typographical error as an actual error; and
associating an alternative string with the actual error.

14. The non-transitory computer-readable medium of claim 10, wherein the one or more parameter-specific references comprises at least one of an author-specific reference, a title-specific reference, a topic-specific reference, or a publisher-specific reference.

15. The non-transitory computer-readable medium of claim 10, wherein the feedback for the work comprises at least one of a user identifier, a work identifier, at least one string identified as a potential typographical error, a position of the at least one string in a work, a decision indicating whether a corresponding string is an author-intended string, a confidence level of the decision, or at least one parameter associated with the corresponding string.

16. The non-transitory computer-readable medium of claim 10, wherein updating one or more parameter-specific references using the author-intended string comprises:
compiling, based on the sorted feedback, one or more parameter-specific statistics;
determining that at least one of the one or more parameter-specific statistics exceeds a threshold; and
identifying a first potential typographical error of the one or more potential typographical errors as an acceptable string.

17. The non-transitory computer-readable medium of claim 16, wherein the parameter-specific statistics comprise at least one of a number of times users mark a potential typographical error as an author-intended string, a total number of times a potential typographical error is marked as an author-intended string, a percentage of feedback that marked the potential typographical error as an author-intended string, a percentage of users that marked the potential typographical error as an author-intended string, or a number of times the one or more potential typographical errors are marked as an author-intended string for a parameter.

18. An apparatus comprising:

a memory;

a processing device operatively coupled to the memory, the processing device to:

provide data indicative of presence of a potential typographical error in a work to a user via a graphical user interface, wherein the work comprises a plurality of words;

receive input identifying the potential typographical error that is an author-intended string for the work, the input comprising an indicator that specifies that the potential typographical error is an author-intended string for the work, wherein the author-intended string comprises at least one of an author-intended spelling of one or more words, an author-intended punctuation, an author-intended grammar, or an author-intended use of one or more foreign language words;

determine one or more parameters to associate with the author-intended string, wherein the one or more parameters comprises at least one of an author associated with the work, a title associated the work, a topic associated with the work, or a publisher associated with the work; and provide feedback for the work to a server computing machine, the feedback comprising identification of the author-intended string and the one or more parameters associated with the author-intended string, wherein the server computing machine is to:

combine the feedback with additional feedback from a plurality of users for the work and one or more additional works to generate a combined feedback;

sort the combined feedback based on the one or more parameters associated with the author-intended string to generate a sorted feedback; and update, based on the sorted feedback, a reference using the author-intended string.

19. The apparatus of claim 18, wherein the input comprises at least one of a user identifier, a work identifier, at least one string identified as a potential typographical error, a position of the at least one string in the work, a decision indicating whether a corresponding string is an author-intended string, a confidence level of the decision, or at least one parameter associated with the corresponding string.

20. The apparatus of claim 18, wherein the data indicative of the presence of the potential typographical error comprises at least one of a string identified as the potential typographical error, a position of the string in the work, or a context for the string in the work.

* * * * *